Figure 3:
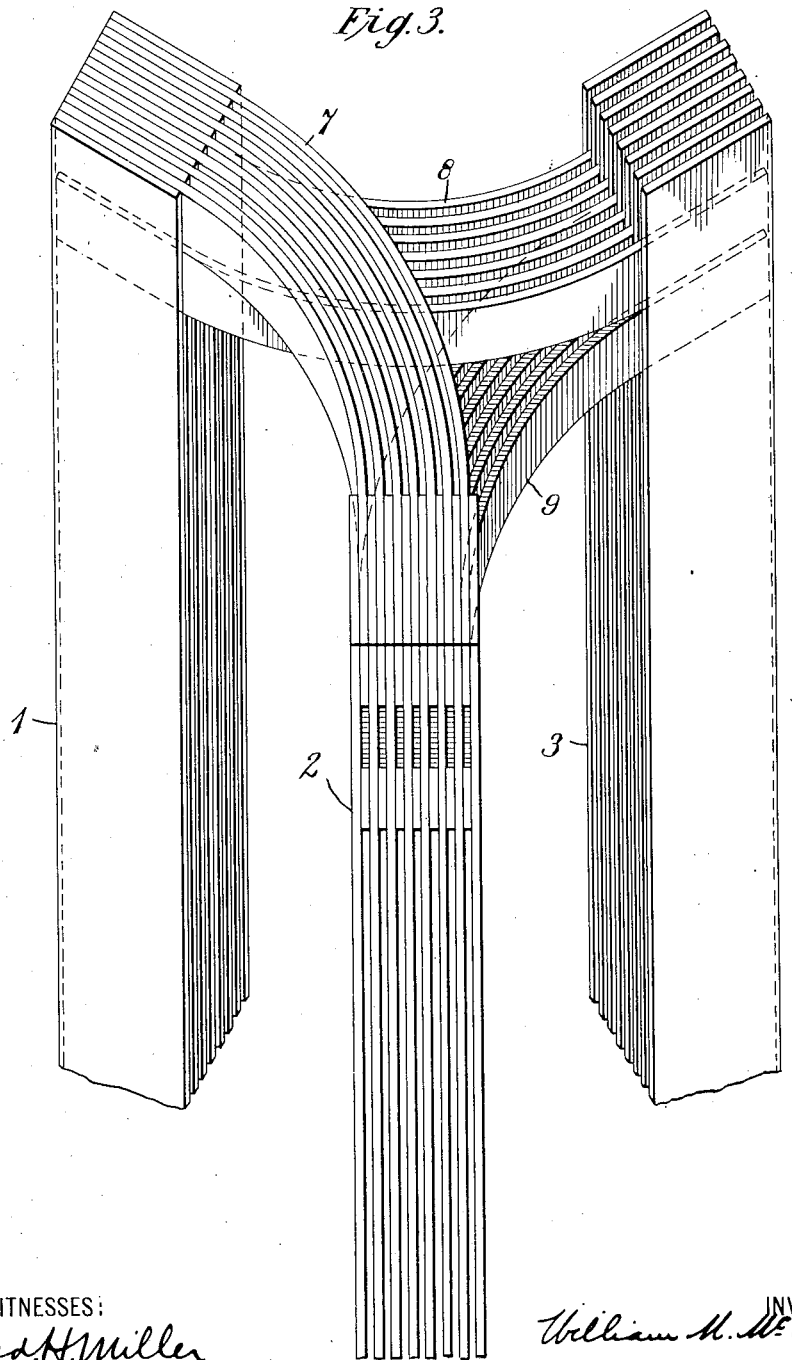

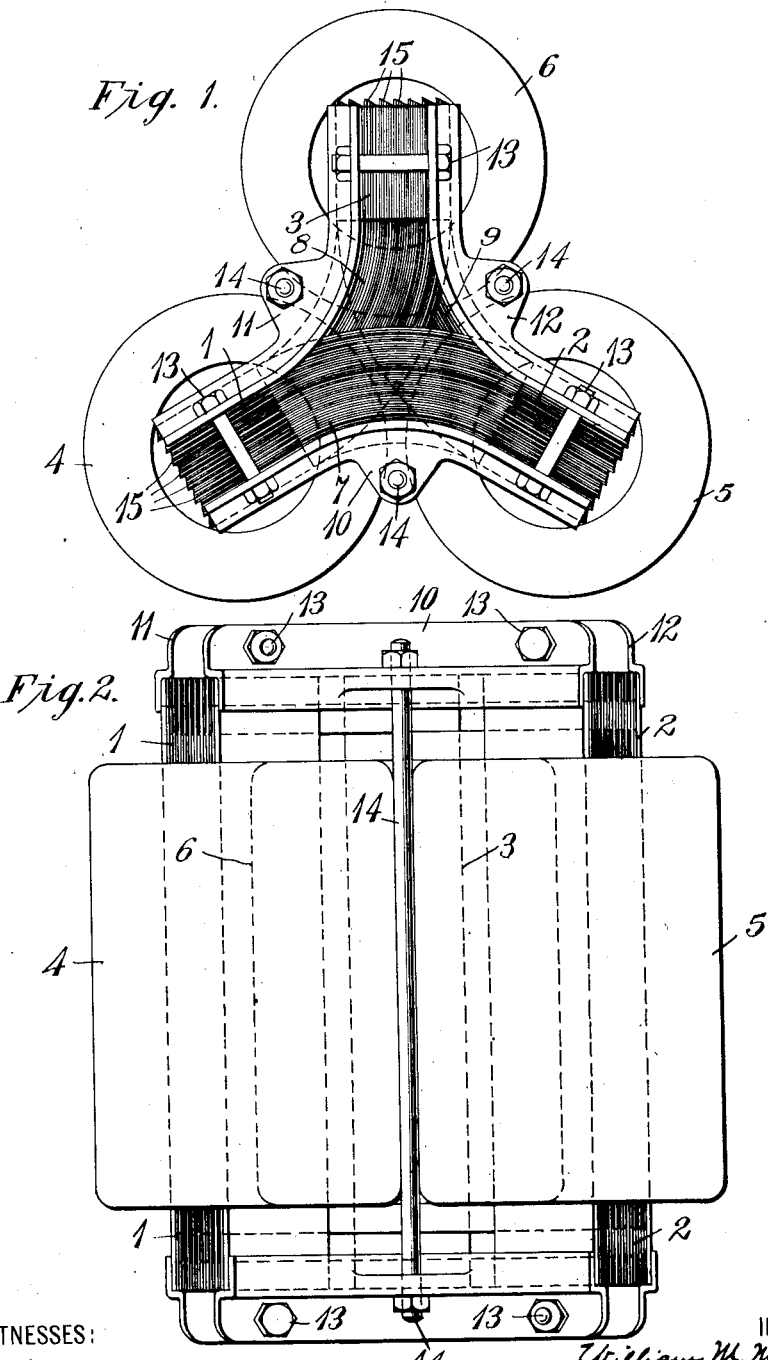

W. M. McCONAHEY.
POLYPHASE TRANSFORMER.
APPLICATION FILED OCT. 7, 1908.

999,825.

Patented Aug. 8, 1911.
2 SHEETS—SHEET 2.

UNITED STATES PATENT OFFICE.

WILLIAM M. McCONAHEY, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

POLYPHASE TRANSFORMER.

999,825. Specification of Letters Patent. Patented Aug. 8, 1911.

Application filed October 7, 1908. Serial No. 456,564.

*To all whom it may concern:*

Be it known that I, WILLIAM M. McCONAHEY, a citizen of the United States, and a resident of Pittsburg, in the county of Allegheny and State of Pennsylvania, have invented a new and useful Improvement in Polyphase Transformers, of which the following is a specification.

My invention relates to electric apparatus, and it has for its object to provide transformers or reactance coils which shall be adapted for use in connection with polyphase electric circuits and shall embody a specially advantageous and symmetrical design.

Two or three-phase circuits are usually employed for the transmission of large quantities of electric power and polyphase transformers or groups of single-phase transformers are usually required between the high voltage transmission circuits and the generating and receiving circuits.

According to my present invention, I provide a single transformer which is adapted for use with three-phase circuits and is specially simple and compact in construction. In general, the transformer comprises three laminated core members on which suitable coils are mounted, and inwardly bent end members which severally connect the core members in pairs, the arrangement of parts being such that the end members are of the same width as the core members and are located one above another in parallel planes. None of the magnetic lines produced in the core are obliged to cross the laminæ in traversing the junction of the end and core members and, consequently, a material reduction in the iron loss is effected.

Figure 1 of the accompanying drawings is a plan view of a transformer constructed in accordance with my invention, and Fig. 2 is an elevation of the device shown in Fig. 1. Fig. 3 is an isometric perspective of the core structure of the transformer.

Referring to the drawings, the device illustrated comprises a core having three magnetizable core members 1, 2 and 3 which are symmetrically arranged, each being at equal distances from the other two and their axes being substantially parallel, and interconnecting end members which complete the magnetic circuits around a plurality of coils 4, 5 and 6 which are severally disposed on the core members 1, 2 and 3. The plates or laminæ, of which each of the core members is built up, are disposed in parallel planes, the mid plane of each member being radial relative to the axis of the assembled device.

The end members are similar to each other and each comprises three parts 7, 8 and 9 which respectively connect the ends of the core members 1, 2 and 3 in pairs. The plates of which the end members are formed are bent substantially into arcs of circles and are interleaved with the plates of the core members. The three parts constituting the end members are disposed in different parallel planes adjacent to each other so they do not interfere, and the assembled structure is clamped together by means of end plates 10, 11 and 12 which engage the end members and the ends of the core members 1, 2 and 3 and are clamped together by means of cross bolts 13 and longitudinal bolts 14.

Since the several parts 7, 8 and 9 of the end core members are bent inwardly, as above indicated, the strips or plates of which they are composed differ in length and, in order to reduce the number of different sizes of plates required, I divide the plates into groups 15, the plates of each group being of the same length.

It will be observed that the end core members are of the same width as the core members 1, 2 and 3 and are interleaved with them, the plates or laminæ of the two members being parallel at the junction points. By this means, the iron loss in the transformer is materially less than that in transformers heretofore known and used. The symmetrical arrangement of the three body members of the core and the coils located on them is specially advantageous in reducing the total amount of space occupied by the transformer, so that it is adapted to be inserted in a cylindrical tank or casing of minimum size.

Structural modifications may evidently be effected in the device illustrated without departing from the spirit of my invention, and I desire that only such limitations shall be imposed as are indicated in the appended claims.

I claim as my invention:

1. In a transformer, the combination with more than two symmetrically disposed laminated magnetizable core members and coils disposed on said members, of laminated magnetizable end members, interconnecting the ends of the core members in different planes, each end member being built up to the same thickness as the core members and interleaved with two of them.

2. In a transformer, the combination with three parallel laminated core members symmetrically arranged about a common axis with their middle laminæ radial, and coils surrounding said members, of magnetizable end members for interconnecting the three core members, each of said end members comprising a ring segment of the same thickness as the core members and interleaved with two of them, and means for clamping the end members and the core members together.

In testimony whereof, I have hereunto subscribed my name this 25th day of September, 1908.

WILLIAM M. McCONAHEY.

Witnesses:
 WM. P. L'HOMMEDIEU,
 BIRNEY HINES.